Aug. 30, 1955   F. HERZEGH   2,716,435
TIRE TREAD
Filed Jan. 19, 1951

Inventor
Frank Herzegh
By
Att'y

United States Patent Office 2,716,435
Patented Aug. 30, 1955

2,716,435

TIRE TREAD

Frank Herzegh, Cleveland, Ohio, assignor to The B. F. Goodrich Company, New York, N. Y., a corporation of New York Application January 19, 1951, Serial No. 206,880

2 Claims. (Cl. 152—209)

This invention relates to tire treads and has for an object to provide a tread that combines to a high degree the qualities of resistance to skidding, resistance to wear and quietness in operation.

It is especially desirable that tires for passenger automobiles have these three qualities to a high degree in the same tread construction. To have the desired wear resistance a tire should wear evenly and retain the tread after many miles of service and to have the desired resistance to skidding the tire should grip effectively wet as well as dry pavements. Quietness of operation should be provided at all speeds of operation of the automobile. These qualities of tires have become of increased importance with the introduction of improved smoother pavements, and of vehicles having greater braking power and greater acceleration with quieter engines.

While tire treads proposed heretofore often have provided to some extent one or two of these qualities it has been difficult to provide all three qualities to a high degree in a single tire. For instance, tire treads which have good skid resistance frequently have one or more of the following objectionable characteristics: noisy operation, lateral instability, inferior wear resistance and irregular wearing over the surface of the tire tread. Likewise tire treads which have been designed for long life and quiet operation frequently have lacked the desired skid-resistance.

It has been proposed heretofore, to the end of preserving maximum tread contact area while improving the skid resistance, to provide a series of spaced-apart incisions crosswise of the tread. While this has given improved skid resistance the prior schemes have resulted in noisy operation which is exceedingly objectionable at times. The prior efforts of which I am aware have all concerned themselves with what may be termed "coarse spacing" of the incisions, that is, spacing in the circumferential direction of the tread for the most part not closer than about ten cuts per inch and in some cases as far apart as one incision every few inches. Tires with cuts at coarse spacing have been found to be exceedingly noisy in operation and have required expedients such as varying the spacing of the incisions in an attempt to modify the sound waves causing the noise.

As a result of numerous tests and experiments I have found that instead of resorting to coarse spacing, it is entirely feasible and moreover productive of strikingly improved results to utilize incisions across the tire tread of fine spacing in the longitudinal direction of the tread of more than 12 incisions per inch measured circumferentially of the tire and preferably considerably higher than this figure, the incisions being cut substantially without the removal of tire material. Good results have been obtained with fine spacing of about 16 incisions per inch although in some respects even better results are obtained with even finer spacing.

I have found as one of the results that the wear resistance of tires with fine spacing of the incisions is greatly improved over tires without the fine spacing. It is believed that the increased wear resistance obtained is attributable at least in part to the decreased relative movement between the tire tread surface and the road surface resulting from the increased number of elements of tread material formed by the incisions, which elements in the case of the cuts at fine spacing are bound together at one edge in a manner that may be likened somewhat to the leaves of a book. The leaves are mutually supported and at the same time are flexible for decreasing sliding movement of the leaf edges on the road and for yielding under blows by hard objects so as to lessen wearing by abrasion at the point of application of the force. The finely spaced incisions also decrease the resistance to bending of the tire tread which lesser bending resistance reduces the heat generated by hysteresis in operation and thereby increases the wear resistance of the tread. It has been found that fine spacing of the incisions increases skid resistance due to the multiplicity of leaf edges at the incisions which are available in the pavement contacting area to engage the pavement for wiping and gripping the pavement. The incisions and thin leaves provide a multiplicity of closely spaced channels when the incisions, which are made without the removal of any material and are normally closed are opened by the action of the tread on the pavement. These channels are effective for conducing water away from the gripping surfaces, which is also an important factor in increasing the skid resistance. In addition I have discovered that exceedingly quiet operation is obtained with tire treads having fine spacing even though no variable spacing is used and the close incisions are uniformly spaced.

It is an object of this invention to provide to a high degree in the same tire tread the combined qualities of resistance to wear, uniformity of wear, resistance to skidding, quietness and stability.

Other objects are to provide improved flexibility and yieldability of the tire tread, to provide a multiplicity of wiping and gripping edges, and to provide a large tread surface area. A further object is to provide a tread that maintains an attractive appearance even after extensive service.

These and other objects will be apparent from the following description, reference being made to the accompanying drawings in which.

Figure 1:
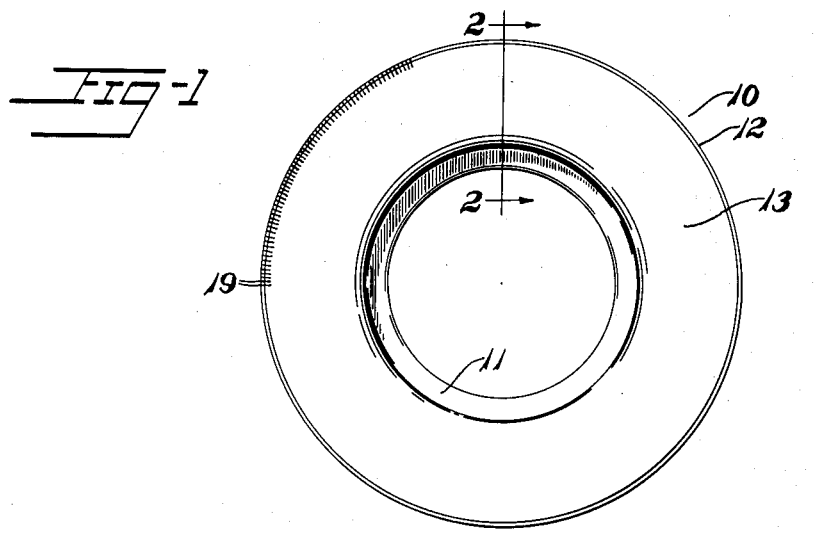
Fig. 1 is an elevation of a tire built in accordance with and embodying the invention.
Figure 2:
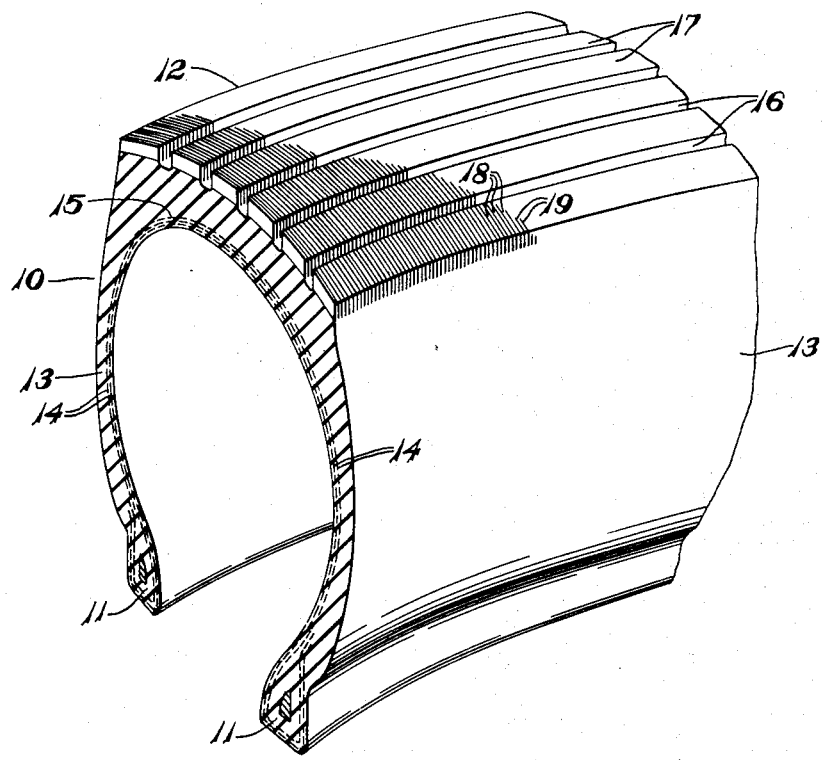
Fig. 2 is a section in perspective taken along line 2—2 of Fig. 1, parts being broken away.

Referring to the drawings a tire 10 of resilient rubber material is shown which has bead portions 11, 11 at the inner periphery, a tread 12 at the outer periphery which may be of any suitable rubber tread material whether natural rubber or synthetic rubber or blends thereof and intervening sidewalls 13, 13. Reinforcing plies 14, 14 of woven or weftless fabric may be embedded in the tire and extend from bead portion to bead portion and under the tread 12. Certain of the plies 14, 14 may terminate short of the bead portions 11, 11 to provide a breaker ply 15 at the crown of the tire 10. The road-engaging surface of the tread 12 has circumferential grooves 16, 16 leaving circumferential laterally spaced-apart ribs 17, 17, although if desired other tread patterns may be used, or the tread face may be plain all over.

In accordance with the invention there is provided in the tread 12 a multiplicity of thin leaves 18, 18 formed by incisions 19, 19 crosswise of the tread of fine spacing in the circumferential direction of the tread which incisions are made substantially without the removal of tread material. The incisions 19, 19 extend across the tread 12 in a direction normal to the centerline of the tread although if desired the cuts may be somewhat oblique to the centerline.

The objects of the invention of obtaining to a high degree the results of resistance to skidding, resistance to wear and quietness in operation, are obtained with fine spacing of about 16 to 18 incisions per inch. Some of the advantages are obtained with less fine spacing than this, but to avoid objectionable noise problems and to obtain other advantages to a satisfactory extent I have found it desirable to use a spacing of more than 12 incisions per inch. The new results are found to be greater as the fineness of the spacing of the incisions 19, 19 is increased considerably above 12 per inch, and tires with incisions at the exceedingly fine spacing of 26 per inch have exhibited excellent results.

While I prefer to use a depth of the incisions 19, 19 of somewhat more than half the height of the ribs 17, 17 to provide a high degree of flexibility of the leaves 18, 18, consistent with stability of the tread, the depth of the incisions may be decreased or increased from this amount while still obtaining many of the advantages herein described. It is preferred that the ratio of the width of the ribs 17, 17 to the height of the ribs be in a range where the ribs have adequate lateral stability despite the increased yieldability of the ribs resulting from the incisions at fine spacing. Excellent results have been obtained with ribs 17, 17 each of a width greater than the height of the rib and also with ribs of a width about the same as the height. I prefer that the width of each rib be not less than about two-thirds of the height of the rib so as to accommodate the fine spacing I desire for the incisions and the advantages thereof without objectionably lessening the lateral stability of the ribs.

The human ear is capable of hearing sounds only within a limited range of frequencies, sometimes referred to as the audible range. In this range sounds of certain frequencies are more readily heard than those of other frequencies when they are produced at the same intensity. Therefore a tread-produced noise which is classed as being objectionable must have a frequency and an adequate intensity such as to be in the range where the human ear can distinguish the sound. In other words the sound must be over the threshold of audibility and below the upper limit of the audible range of frequencies to be classed as objectionable.

With tire treads having coarse spacing of the incisions the frequencies of the impulses produced at normal driving speeds are in the range at which the human ear can readily hear while with the tire treads having fine spacing of the incisions as herein described the frequencies of the impulses produced at normal driving speeds are in the range of frequencies which the human ear has difficulty in hearing or cannot hear.

The intensity of sound produced by tire treads has been observed to increase at a high rate with an increase in speed. With a tire constructed as herein described, the intensity at low speeds is of such a small magnitude that although the frequencies of the sound impulses produced at low speeds may be in the audible range the sound produced by the tire tread is not objectionable. I have found also that before the intensity of the sound impulses builds up by virtue of increase in speed to a point where it might be objectionable to the ear the frequency of the sound impulses increases sufficiently to pass out of the audible range of sound frequencies by virtue of the fine spacing of the incisions 19, 19.

Tires with fine spacing of the incisions have shown greatly increased life as determined by measurements of tread depth at various mileages over similar tires without the incisions in the tread. While all the reasons for the increase in the resistance to wear may not be at once apparent an important factor appears to be the flexibility of the tread provided by the thin leaves 18, 18 between the incisions 19, 19. The flexibility provided by the thin leaves 18, 18, permits resilient adjustment of the tread not only in the matter of reducing abrasion on engagement with rough particles on ground surfaces, but also in the matter of reducing scuffing as a result of the different rolling circumferences existing because of crowning of the tread. The fine spacing of the incisions as herein described provides leaves 18, 18 of the tread material of such thinness that a high degree of flexibility is present for attainment of this result of greatly reduced wear.

Because the flexibility of the tread 12 is increased by the finely spaced incisions 19, 19 the heat which is produced in the tire 10 as it is flexed in operation is decreased. The work which is done in the tire tread 12 is less because the tread is cut by many incisions and the resistance to bending is lower. Therefore since less work is done in the tire the heat of hysteresis is reduced and the effect of heat in reducing the life of the tire is lessened.

The multiplicity of incisions 19, 19 and thin leaves 18, 18 provide a multiplicity of edges at the tread contact surface. The edges operate to wipe the pavement surface and thus increase the skid resistance. In addition channels are formed when the incisions 19, 19 are opened upon contact with the supporting surface. The channels which result in operation are finely spaced and improve the skid resistance of the tread on wet pavement by carrying the water away from the tread surface. Also the flexibility of the tread surface increases the skid resistance because the ability of the tread to conform to the supporting ground surface is increased and the ground contacting area of the tread is increased.

Variations may be made without departing from the scope of the invention as it is defined in the following claims.

I claim:

1. A tire comprising a tread of resilient rubber material including a plurality of circumferentially extending axially spaced traction elements, said elements having in their tread face a multiplicity of thin leaves extending transversely of the tread and entirely across said traction elements with incisions between the leaves cut across the tread substantially without the removal of tread material at substantially uniform fine spacing of about 16 incisions per inch measured circumferentially of the tread providing a high degree of skid resistance on wet pavements by virtue of the multiplicity of flexible transverse leaf edges at the incisions, a high resistance to wear by virtue of the soft yieldability of the tread afforded by the fine spacing of the incisions and providing quietness of operation as a result of the low audibility of the sound impulses produced by the multiplicity of leaves in the tread at all speeds of operation.

2. A resilient tire tread for resistance to slippage in the direction of travel and for stability transversely to the direction of travel, said tread comprising a body of resilient rubber-like material including a plurality of circumferentially extending axially spaced traction elements, said elements having a multiplicity of thin leaves with incisions between the leaves and entirely across said traction elements cut across the tread substantially without the removal of any tread material by a multiplicity of incisions extending transversely to the direction of travel at substantially uniform spacing of about 16 to 18 incisions per inch providing a high degree of skid resistance on wet surfaces by virtue of the multiplicity of flexible leaf edges and incisions and a high resistance to wear by virtue of the soft yieldability of the tread afforded by the fine spacing of the incisions.

References Cited in the file of this patent

UNITED STATES PATENTS

| 2,094,636 | Bull | Oct. 5, 1937 |
| 2,186,180 | Sloman | Jan. 9, 1940 |
| 2,261,025 | Havens | Oct. 28, 1941 |
| 2,302,027 | Havens | Nov. 1, 1942 |

FOREIGN PATENTS

| 522,188 | Great Britain | June 11, 1940 |
| 809,470 | France | Mar. 3, 1937 |